United States Patent
Kwon (10) Patent No.: US 11,038,592 B2
(45) Date of Patent: *Jun. 15, 2021

(54) OPTICAL RELAY SYSTEM AND METHOD FOR SETTING IDENTIFICATION INFORMATION OF REMOTE DEVICE IN OPTICAL RELAY SYSTEM

(71) Applicant: SOLiD, INC., Seongnam-si (KR)

(72) Inventor: Youngwoo Kwon, Seoul (KR)

(73) Assignee: SOLiD, INC., Seongman-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/397,603

(22) Filed: Apr. 29, 2019

(65) Prior Publication Data

US 2019/0253147 A1 Aug. 15, 2019

Related U.S. Application Data

(63) Continuation of application No. 15/106,385, filed as application No. PCT/KR2014/007593 on Aug. 14, 2014, now Pat. No. 10,320,485.

(30) Foreign Application Priority Data

Dec. 20, 2013 (KR) .......................... 10-2013-0160208

(51) Int. Cl.
*H04B 10/29* (2013.01)
*H04W 24/02* (2009.01)
(Continued)

(52) U.S. Cl.
CPC ............ *H04B 10/29* (2013.01); *H04B 10/80* (2013.01); *H04W 24/02* (2013.01); *H04W 88/085* (2013.01)

(58) Field of Classification Search
CPC ....... H04B 10/29; H04B 10/80; H04W 24/02; H04W 88/085
(Continued)

(56) References Cited

U.S. PATENT DOCUMENTS 7,715,723 B2  5/2010 Kagawa et al.
9,584,386 B2 * 2/2017 Kim .......................... H04B 1/40
(Continued)

FOREIGN PATENT DOCUMENTS

JP   2011-130251 A   6/2011
JP   2011-191147 A   9/2011
(Continued)

OTHER PUBLICATIONS

Horvath et al; timing measurement and simulation of the activation process in gigabit passive optical networks; Optica Applicata; 2015; pp. 459-471. (Year: 2015).*
(Continued)

*Primary Examiner* — Amritbir K Sandhu
(74) *Attorney, Agent, or Firm* — Sughrue Mion, PLLC (57) ABSTRACT

Provided are an optical relay system and a method for setting identification information of a remote device in an optical relay system. In particular, provided are an optical relay system and a method for setting identification information of a remote device in an optical relay system in which a donor device generates unique identification information of a remote device based on temporary identification information and characteristic information received from the remote device to automatically set identification information of the remote device, and as a result, the optical relay system can be normally implemented rapidly in initial installation of the optical relay system or a change of an optical relay system environment and convenience of a manager and reliability of a mobile communication service can be improved.

17 Claims, 7 Drawing Sheets

(51) Int. Cl.
  *H04B 10/80* (2013.01)
  *H04W 88/08* (2009.01)
(58) Field of Classification Search
  USPC .................................................. 398/106–114
  See application file for complete search history.

(56) References Cited

U.S. PATENT DOCUMENTS

| | | | |
|---|---|---|---|
| 9,602,211 B2* | 3/2017 | Yeo | H04B 10/40 |
| 9,648,580 B1 | 5/2017 | Shekalim | |
| 9,912,387 B2* | 3/2018 | Kim | H04B 7/022 |
| 9,954,707 B2* | 4/2018 | Kwon | H04B 7/15 |
| 10,211,908 B2* | 2/2019 | Kim | H04B 7/15585 |
| 10,320,485 B2* | 6/2019 | Kwon | H04B 10/80 |
| 2003/0091045 A1* | 5/2003 | Choi | H04Q 11/0067 370/390 |
| 2006/0135181 A1 | 6/2006 | Dale et al. | |
| 2007/0254626 A1 | 11/2007 | Ahlgren | |
| 2008/0089686 A1* | 4/2008 | Kazawa | H04J 3/0682 398/71 |
| 2008/0095368 A1* | 4/2008 | Iida | H04L 63/0272 380/259 |
| 2009/0263132 A1* | 10/2009 | Rafel | H04L 41/0896 398/66 |
| 2009/0316763 A1 | 12/2009 | Erkip et al. | |
| 2011/0076013 A1 | 3/2011 | Valvo et al. | |
| 2012/0128358 A1* | 5/2012 | Zhang | H04Q 11/0067 398/63 |
| 2012/0294613 A1* | 11/2012 | Hood | H04Q 11/0067 398/67 |
| 2012/0314799 A1* | 12/2012 | In De Betou | H04L 25/4908 375/295 |
| 2012/0327789 A1* | 12/2012 | Grenier | H04L 43/10 370/252 |
| 2013/0004160 A1 | 1/2013 | Chen et al. | |
| 2013/0143527 A1 | 6/2013 | Randazzo et al. | |
| 2013/0167196 A1 | 6/2013 | Spencer et al. | |
| 2013/0230326 A1 | 9/2013 | Hu et al. | |
| 2013/0336111 A1* | 12/2013 | Vos | H04L 41/08 370/230 |
| 2013/0336655 A1* | 12/2013 | Grobe | H04J 14/0282 398/67 |
| 2014/0036737 A1 | 2/2014 | Ekpenyong | |
| 2014/0161436 A1* | 6/2014 | Lee | H04B 10/272 398/1 |
| 2014/0178072 A1* | 6/2014 | Yoo | H04Q 11/0067 398/66 |
| 2014/0186039 A1* | 7/2014 | Luo | H04L 12/287 398/66 |
| 2014/0233944 A1* | 8/2014 | Vetter | H04J 14/0282 398/34 |
| 2014/0294385 A1* | 10/2014 | Khotimsky | H04Q 11/0067 398/58 |
| 2014/0368335 A1 | 12/2014 | Jordan et al. | |
| 2015/0087329 A1 | 3/2015 | Stratford et al. | |
| 2015/0372754 A1 | 12/2015 | Choi et al. | |
| 2016/0359565 A1* | 12/2016 | Kwon | H04B 10/80 |
| 2017/0134892 A1 | 5/2017 | Harel | |
| 2018/0027430 A1 | 1/2018 | Pasulka | |

FOREIGN PATENT DOCUMENTS

| | | |
|---|---|---|
| KR | 10-0946111 B1 | 3/2010 |
| KR | 10-2010-0060746 A | 6/2010 |
| KR | 10-2011-0021972 A | 3/2011 |

OTHER PUBLICATIONS

Horvath et al; Timing measurement and simulation of the activation process in gigabit passive optical networks; 2015; Optical Application, vol. XLV No. 4; pp. 1-13 (Year: 2015).*
International Search Report of PCT/KR2014/007593 dated Nov. 14, 2014.
Korean Notice of Allowance issued in KR 10-2013-0160208 dated Mar. 2, 2016.

* cited by examiner

OPTICAL RELAY SYSTEM AND METHOD FOR SETTING IDENTIFICATION INFORMATION OF REMOTE DEVICE IN OPTICAL RELAY SYSTEM

CROSS REFERENCE TO RELATED APPLICATIONS

This application is a continuation application of U.S. application Ser. No. 15/106,385, filed on Jun. 20, 2016, which is a National Stage of International Application No. PCT/KR2014/007593, filed Aug. 14, 2014, and claims priority from Korean Patent Applications No. 10-2013-0160208 filed Dec. 20, 2013, the contents of which are incorporated herein by reference in their entireties.

BACKGROUND

1. Field

The inventive concept relates to an optical relay system and a method for setting identification information of a remote device in the optical relay system, and particularly, to an optical relay system and a method for setting identification information of a remote device in the optical relay system which automatically sets the identification information of the remote device.

2. Description of Related Art

Under a mobile communication service, a relay system is used to extend a service to up to a shadow area which a signal of a base station is difficult to reach due to a special geographical feature and a special natural feature. One example of the relay system can include an optical relay system and the optical relay system has been widely used in that signal loss can be minimized in a recent mobile communication service using a signal having a relatively high frequency.

The optical relay system is constituted by a donor device and at least one remote device connected to each other through an optical medium. The donor device manages the remote device so that the optical relay system is normally operated through verifying a status, performance, and the like of the remote device and when a plurality of remote devices is provided, in general, a manager manually sets identification information corresponding to the respective remote devices to allow the donor device to differentially manage the respective remote devices.

As described, when the identification information of each remote device is manually set, in initial installation of the optical relay system or a change of an optical relay system environment (for example, in replacement/repairing of the device, in occurrence of a communication failure by cutting of an optical cable, and the like), it is difficult to rapidly and conveniently implement the optical relay system in a normal state and when an error occurs in setting the identification information due to a mistake of the manager, it is difficult to guarantee reliability of the mobile communication service and a lot of time and cost required for setting the identification information is consumed.

SUMMARY

The inventive concept is direct to an optical relay system and a method for setting identification information of a remote device in the optical relay system which automatically set identification information of a remote device to guarantee convenience of an operation and reliability of a service.

According to an aspect of the inventive concept, an optical relay system includes: at least one remote device generating and outputting temporary identification information and characteristic information; and a donor device receiving the temporary identification information and the characteristic information from the remote device and generating unique identification information of the remote device based on the temporary identification information and the characteristic information.

In an embodiment, the characteristic information may include a delay value of a signal transmitted/received between the remote device and the donor device.

In an embodiment, the characteristic information may include a frame counting value of the signal transmitted/received between the remote device and the donor device.

In an embodiment, the characteristic information may include a position value of a global positioning system (GPS) of the remote device or a position value of the remote device based on a base station.

In an embodiment, the remote device may include a characteristic measurement unit measuring a characteristic value of the remote device in response to a registration request message received from the donor device; and a remote control unit randomly generating the temporary identification information in response to the registration request message received from the donor device and generating the characteristic information based on the characteristic value.

In an embodiment, the donor device may include a donor control unit generating the registration request message transmitted to the remote device and generating the unique identification information of the remote device.

According to another aspect of the inventive concept, a method for setting identification information of a remote device in an optical relay system, includes: transmitting, by a donor device, a registration request message to at least one remote device; generating, by the remote device, temporary identification information in response to the registration request message; generating, by the remote device, characteristic information in response to the registration request message; transmitting, by the remote device, the temporary identification information and the characteristic information to the donor device; and generating, by the donor device, unique identification information of the remote device based on the temporary identification information and the characteristic information.

An optical relay system and a method for setting identification information of a remote device in the optical relay system according to the inventive concept, a donor device generates unique identification information of a remote device based on temporary identification information and characteristic information received from the remote device to automatically set identification information of the remote device.

As a result, an optical relay system and a method for setting identification information of a remote device in the optical relay system according to the inventive concept, the optical relay system may be normally implemented rapidly in initial installation of the optical relay system or a change of an optical relay system environment and convenience of a manager is improved. Further, reliability of a mobile communication service can be improved because an error which can occur at the time of manually setting identification information is prevented. In addition, a time and cost for setting the identification information is reduced to provide the mobile communication service.

BRIEF DESCRIPTION OF THE FIGURES

A brief description of each drawing is provided to more sufficiently understand drawings used in the detailed description of the inventive concept.

DETAILED DESCRIPTION OF EXEMPLARY EMBODIMENTS

Hereinafter, embodiments of the inventive concept will be described in detail with reference to the accompanying drawings. Like reference numerals refer to like elements in the drawings and a duplicated description of like elements will be skipped.

Embodiments of the inventive concept are provided to more completely describe the inventive concept to those skilled in the art and various modifications of the embodiments described below can be made and the scope of the inventive concept is not limited to the embodiments described below. Still, the embodiment is provided to make the present disclosure be more substantial and complete and completely transfer the spirit of the inventive concept to those skilled in the art.

In describing the embodiments of the inventive concept, detailed description of associated known function or constitutions will be omitted if they make the gist of the inventive concept unclear. In addition, terms used in the specification as terms used to appropriately express the embodiments of the inventive concept may be changed depending on an intention of a user or an operator or customs to which the inventive concept belongs. Accordingly, the terms need to be defined base on details throughout this specification. Like reference numerals refer to like elements presented in each drawing.

An optical relay system according to an embodiment of the inventive concept which is used to extend service coverage without additional installation of a base station in a shadow area in which a radio signal is difficult to be connected with the base station, such as an in-building area, a subway, and a deep high mountain may be, for example, a distributed antenna system (DAS).

The optical relay system according to the embodiment of the inventive concept may support a mobile communication standard which is globally used. For example, the optical relay system may support frequencies of a verify high frequency (VHF), an ultra high frequency (UHF), 700 MHz, 800 MHz, 850 MHz, 900 MHz, 1900 MHz, and 2100 MHz bands. In addition, the optical relay system may support multiple mobile communication standards including a representative analog mobile communication service (advanced mobile phone service (AMPS)) and time-division multiplexing access (TDMA), code division multiple access (CDMA), asynchronous wideband code division multiple access (WCDMA), high speed downlink packet access (HSDPA), long term evolution (LTE), long term evolution advanced (LTE-A), and the like.

Figure 1:
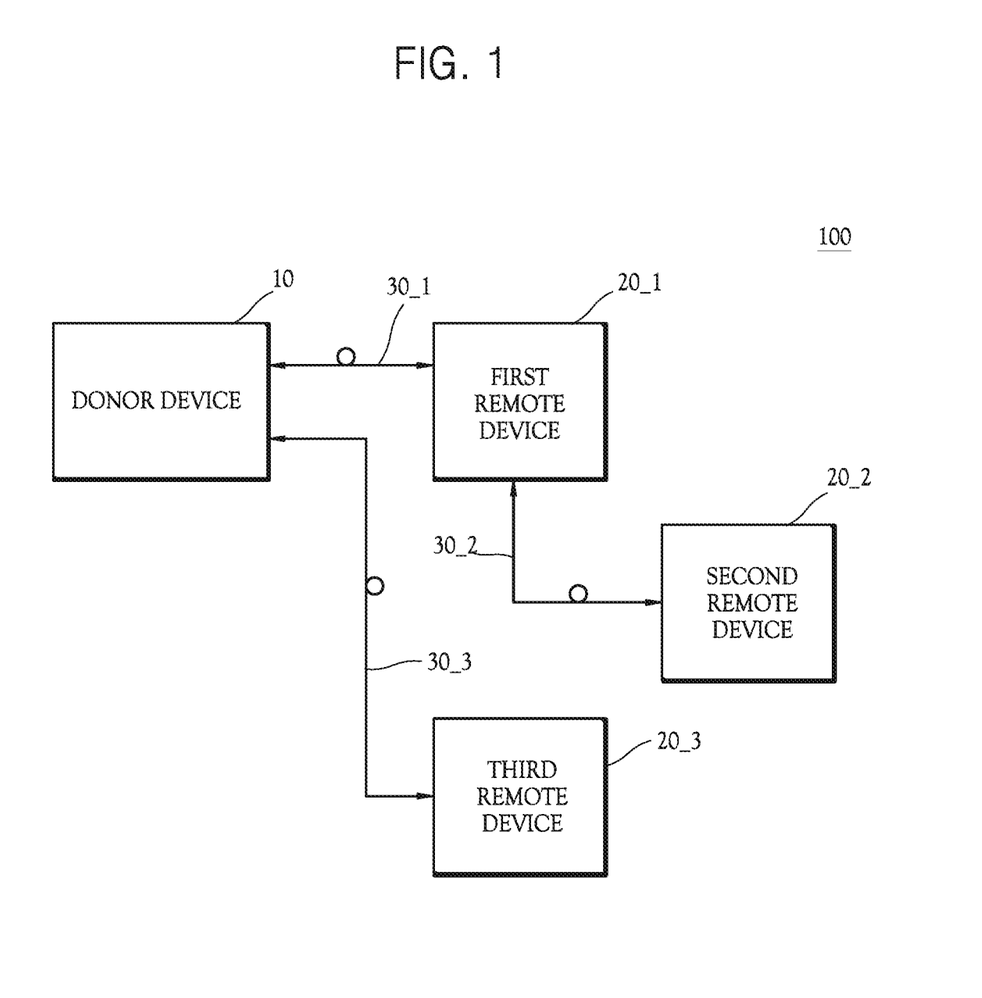
FIG. 1 is a block diagram schematically illustrating an optical relay system according to an embodiment of the inventive concept.

FIG. 1 is a block diagram schematically illustrating an optical relay system 100 according to an embodiment of the inventive concept.

Referring to FIG. 1, the optical relay system 100 may include a donor device 10 and first to third remote devices 20_1 to 20_3.

The donor device 10 may, for example, be connected with at least one base station (not illustrated) by wire or wireless. The donor device 10 may be connected with a first remote device 20_1 via a first optical medium 30_1. The donor device 10 may be connected with a second remote device 20_2 connected to the first remote device 20_1 by a second optical medium 30_2 through the first remote device 20_1. The donor device 10 may be connected with a third remote device 20_3 via a third optical medium 30_3. The first to third optical media 30_1 to 30_3 may be, for example, an optical cable.

Meanwhile, in FIG. 1, it is illustrated that the donor device 10 is connected with the first to third remote devices 20_1 to 20_3 to constitute the optical relay system 100, but the inventive concept is not limited thereto. The donor device 10 is connected with four or more remote devices through the optical medium to constitute the optical relay system 100. For example, in the optical relay system 100, at least one additional remote device may be connected to the donor device 10 in parallel to the first and third remote devices 20_1 and 20_3. Alternatively, the additional remote device may be connected to a lower end of any one of the first to third remote devices 20_1 to 20_3 like the second remote device 20_2.

The donor device 10 may receive a downlink RF signal from the base station. The downlink RF signal may include multiple frequency band signals and the donor device 10 may convert the downlink RF signal into a downlink digital signal. The donor device 10 may convert the downlink digital signal into a downlink optical signal and transmits the downlink optical signal to the first to third remote devices 20_1 to 20_3.

The donor device 10 may receive an uplink optical signal from the first to third remote devices 20_1 to 20_3. The donor device 10 may convert the uplink optical signal into an uplink digital signal, convert the uplink digital signal into an uplink RF signal which is an original signal, and transmit the uplink RF signal to the base station.

Each of the first to third remote devices 20_1 to 20_3 may convert the downlink optical signal received from the donor device 10 into the downlink digital signal. Each of the first to third remote devices 20_1 to 20_3 may filtering, amplification, and analogization-processes the downlink digital signal and convert the downlink digital signal into the downlink RF signal. Each of the first to third remote devices 20_1 to 20_3 may transmit the downlink RF signal through an antenna (not illustrated).

Each of the first to third remote devices 20_1 to 20_3 may receive multiple frequency band signals provided from terminals (not illustrated) through the antenna. Each of the first to third remote devices 20_1 to 20_3 combines the multiple frequency band signals to generate the uplink RF signal. Each of the first to third remote devices 20_1 to 20_3 may digitalize the uplink RF signal and thereafter, convert the uplink digital signal into the uplink optical signal and transmit the uplink optical signal to the donor device 10 through the first to third optical media 30_1 to 30_3.

In the optical relay system 100, the donor device 10 may automatically set the first to third remote devices 20_1 to 20_3 based on unique characteristics of the first to third remote devices 20_1 to 20_3 and differentiate and manage the first to third remote devices 20_1 to 20_3 through the identification information of each of the first to third remote devices 20_1 to 20_3. Hereinafter, this will be described with reference to FIGS. 2 to 7.

Figure 2:
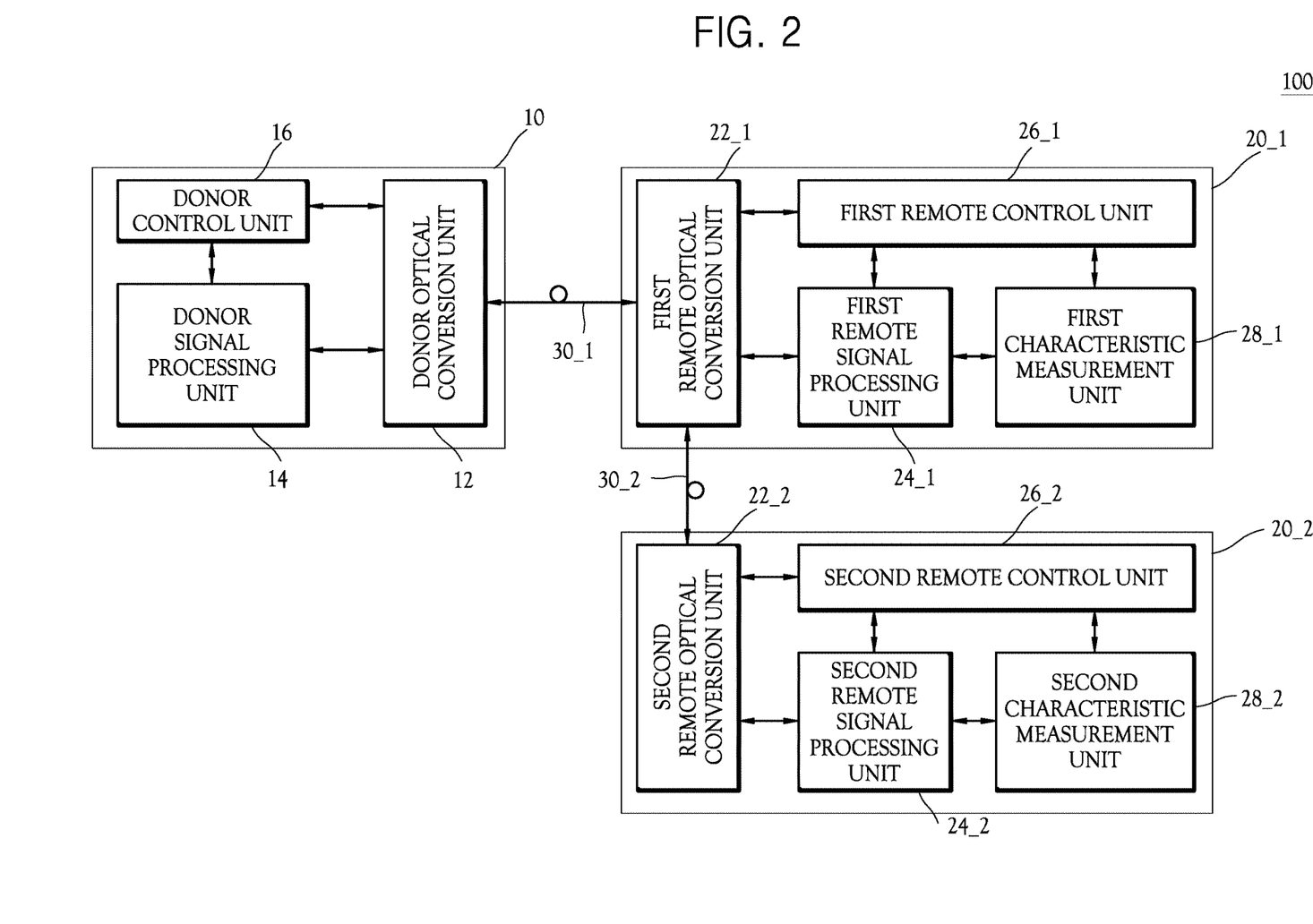
FIG. 2 is a block diagram schematically illustrating the optical relay system of FIG. 1.

FIG. 2 is a block diagram schematically illustrating the optical relay system 100 of FIG. 1. In describing FIG. 2, since the first to third remote devices 20_1 to 20_3 have substantially the same configuration, the third remote device 20_3 is omitted and only the first and second remote devices are illustrated for easy description and FIG. 2 is described by premising the second remote device 20_2 is connected to the lower end of the first remote device 20_1 to transmit/receive the signal to/from the donor device 10 through the first remote device 20_1. Meanwhile, in FIG. 2, it is illustrated that each of the donor device 10 and the first and second remote devices 20_1 and 20_2 includes one signal processing unit and one optical conversion unit by premising that the optical relay system is capable of supporting multiple services, but the inventive concept is not limited thereto. When the optical relay system 100 is not capable of supporting the multiple services, each of the donor device 10 and the first and second remote devices 20_1 and 20_2 includes two or more signal processing units and optical conversion units.

Referring to FIG. 2, the donor device 10 may include a donor optical conversion unit 12, a donor signal processing unit 14, and a donor control unit 16.

The donor optical conversion unit 12 may convert the downlink digital signal received from the donor signal processing unit 14 into the downlink optical signal and transmit the downlink optical signal to the first and second remote devices 20_1 and 20_2. The donor optical conversion unit 12 may convert a signal received from the donor control unit 16, for example, a message such as registration request message to be described below into the optical signal and transmit the optical signal to the first and second remote devices 20_1 and 20_2.

The donor optical conversion unit 12 may convert the uplink optical signal received from the first and second remote devices 20_1 and 20_2 into the uplink digital signal and transmit the uplink digital signal to the donor signal processing unit 14. The donor optical conversion unit 12 may convert the optical signal, which is obtained by optically converting a message such as an update response message and received from the first and second remote devices 20_1 and 20_2, into the digital signal and transmit the digital signal to the donor signal processing unit 14 and the donor control unit 16.

The donor signal processing unit 14 may digitalize the downlink RF signal received from a base station (not illustrated) and transmit the digitalized downlink RF signal to the donor optical conversion unit 12. Although not illustrated in FIG. 2, the donor signal processing unit 14 may include a frequency conversion unit converting the downlink RF signal received from the base station into a downlink IF signal, an analog/digital conversion unit sampling the downlink IF signal and converting the sampled downlink IF signal into the downlink digital signal, a digital signal processing unit performing signal-processing such as filtering, amplification, noise removal, and the like with respect to the downlink digital signal, and a framer combining the downlink digital signals and configuring the combined downlink digital signal as a frame.

The donor signal processing unit 14 may update a counter field value or update the counter field value into a predetermined value in the frame of the downlink digital signal and transmit the downlink digital signal, whose counter field value is updated, to the donor optical conversion unit 12.

The donor signal processing unit 14 may recover the uplink digital signal received from the donor optical conversion unit 12 into the original signal and transmit the recovered original signal to the base station. Although not illustrated in FIG. 2, the donor signal processing unit 14 may include a deframer extracting the digital signal of the multiple services from the uplink digital signal configured as the frame, the digital signal processing unit performing the signal-processing such as the filtering, the amplification, the noise removal, and the like with respect to the uplink digital signal transmitted from the deframer, the digital/analog conversion unit analogizing the uplink digital signal signal-processed by the digital signal processing unit and converting the analogized signal into an uplink IF signal, and the frequency conversion unit converting the uplink IF signal into the uplink RF signal.

The donor control unit 16 may monitor and control statuses of the donor optical conversion unit 12 and the donor signal processing unit 14.

The donor control unit 16 may generate the registration request message transmitted from the first and second remote devices 20_1 and 20_2 in order to configure the identification information of the first and second remote devices 20_1 and 20_2 when the optical relay system 100 is initially installed. Alternatively, the donor control unit 16 may generate the registration request message transmitted from the first and second remote devices 20_1 and 20_2 in order to update predetermined identification information when there is an environmental change such as replacement of any one of the first and second remote devices 20_1 and 20_2. The registration request message may be transmitted to the first and second remote devices 20_1 and 20_2 through the donor signal processing unit 14 and/or the donor optical conversion unit 12. The registration request message may be transmitted to the first remote device 20_1 while the counter field value in the frame is initialized.

The donor control unit 16 may generate unique identification information (hereinafter, referred to a unique ID of the first and second remote devices 20_1 and 20_2 based on temporary identification information (hereinafter, a temporary ID) and characteristic information received from the first and second remote devices 20_1 and 20_2. For example, the donor control unit 16 may list the temporary ID and the characteristic information of each of the first and second remote devices 20_1 and 20_2, sorts the listed temporary ID and characteristic information in a descending order based on a predetermined criterion, for example, a magnitude of a characteristic information value, and thereafter, generate the unique ID of each of the first and second remote devices 20_1 and 20_2 according to a rearrangement order. However, the inventive concept is not limited thereto and the donor control unit 16 may generate the unique IDs of the first and second remote devices 20_1 and 20_2 based on the temporary ID and the characteristic information by various schemes.

The donor control unit 16 may receive an ID update request message to the first and second remote devices 20_1 and 20_2. The ID update request message may include the unique ID of each of the first and second remote devices 20_1 and 20_2.

The donor control unit 16 may verify a status and a capability of each of the first and second remote devices 20_1 and 20_2 based on the generated unique ID of each of the first and second remote devices 20_1 and 20_2 and distinguish and manage the first and second remote devices 20_1 and 20_2.

Continuously referring to FIG. 2, the first remote device 20_1 may include a first remote optical conversion unit 22_1, a first remote signal processing unit 24_1, a first remote control unit 26_1, and a first characteristic measurement unit 28_1.

The first remote optical conversion unit 22_1 may receive the downlink optical signal from the donor device 10 through the first optical medium 30_1 and convert the downlink optical signal into the downlink digital signal and transmit the downlink digital signal to the first remote signal processing unit 24_1. The first remote optical conversion unit 22_1 may receive the optically converted message from the donor device 10 through the first optical medium 30_1. The first remote optical conversion unit 22_1 may receive the downlink optical signal to the second remote device 20_2 through the second optical medium 30_2.

The first remote optical conversion unit 22_1 may receive the uplink digital signal from the first remote signal processing unit 24_1, and convert the uplink digital signal into the uplink optical signal and transmit the uplink optical signal to the donor device 10. The first remote optical conversion unit 22_1 may convert a signal received from the first remote control unit 26_1, for example, a message such as an update response message to be described below into the optical signal and transmit the optical signal to the donor device 10. The first remote optical conversion unit 22_1 may receive the uplink optical signal and the optical signal acquired by converting the message from the second remote device 20_2 through the second optical medium 30_2.

The first remote signal processing unit 24_1 may recover the downlink digital signal received from the first remote optical conversion unit 22_1 to the downlink RF signal which is the original signal and transmit the downlink RF signal through the antenna (not illustrated). The first remote signal processing unit 24_1 may update the counter field value in the frame of the downlink digital signal and transmit the downlink digital signal, whose counter field value is updated, to the second remote device 20_2 through the first and second remote optical conversion units 22_1 and 22_2.

The first remote signal processing unit 24_1 may digitalize the uplink RF signal received from a terminal (not illustrated) and transmit the digitalized uplink RF signal to the first remote optical conversion unit 22_1.

Although not illustrated in FIG. 2, the first remote signal processing unit 24_1 may include the frequency conversion unit, the digital/analog conversion unit, the analog/digital conversion unit, the digital signal processing unit, the framer, and the deframer like the donor signal processing unit 24_1.

The first remote control unit 26_1 may monitor and control statuses of the first remote optical conversion unit 22_1, the first remote signal processing unit 24_1, and the first characteristic measurement unit 28_1.

The first remote control unit 26_1 may generate the temporary ID in response to the registration request message transmitted from the donor device 10. The first remote control unit 26_1 may randomly generate the temporary ID regardless of the characteristic of the first remote device 20_1. The first remote control unit 26_1 may update the counter field value in the fame of the registration request message and transmit the registration request message, whose counter field value is updated, to the second remote device 20_2.

The first remote control unit 26_1 may receive the characteristic value corresponding to a unique characteristic of the first remote device 20_1 from the first characteristic measurement unit 28_1 and generate the characteristic information based on the characteristic value. The characteristic value may correspond to a delay value, a frame counting value, a position value, and the like as described below and the characteristic information may include any one of the delay value, the frame counting value, the position value, and the like.

The first remote control unit 26_1 may register the unique ID in response to an ID update request message transmitted from the donor device 10.

The first characteristic measurement unit 28_1 may measure a characteristic value of the first remote device 20_1 in response to the registration request message transmitted from the donor device 10. The characteristic value may indicate the unique characteristic of the first remote device 20_1 which may be distinguished from the second remote device 20_2.

The characteristic value may be, for example, a delay value of a signal transmitted/received between the donor device 10 and the first remote device 20_1. Herein, a delay may mean at least one of a transmission delay, a propagation delay, a processing delay, and a queuing delay. In this case, the first characteristic measurement unit 28_1 may be a delay measurement unit (see FIG. 4).

In some embodiments, the characteristic value may be, for example, the frame counting value of the signal transmitted/received between the donor device 10 and the first remote device 20_1. The frame counting value may be a value acquired by counting a frame counter field of the registration request message provided by the donor control unit 16. Alternatively, the frame counting value may be a value acquired by counting the frame counter field of the downlink digital signal provided by the donor signal processing unit 14. In this case, the first characteristic measurement unit 28_1 may be a frame counter (see FIGS. 6 and 7).

In another embodiment, the characteristic value may be the position value of the first remote device 20_1. The position value of the first remote device 20_1 may be the position value of a global positioning system (GPS) or a unique position value of the first remote device 20_1 based on the base station. In this case, the first characteristic measurement unit 28_1 may be a GPS receiver or a modem.

The first characteristic measurement unit 28_1 may transmit the characteristic value to the first remote control unit 26_1, and as a result, the first remote control unit 26_1 may generate the characteristic information based on the characteristic value.

Meanwhile, in FIG. 2, it is illustrated that the first characteristic measurement unit 28_1 is a component separated from the first remote signal processing unit 24_1 and the first remote control unit 26_1, but the inventive concept is not limited thereto. The first characteristic measurement unit 28_1 may be configured integrally with the first remote signal processing unit 24_1 (see FIGS. 4 and 7) or configured integrally with the first remote control unit 26_1 (see FIG. 6).

Since the second remote device 20_2 has substantially the same configuration as the first remote device 20_1, detailed description thereof will be omitted for easy description.

As described above, in the optical relay system 100, the donor device 10 automatically sets the unique ID of each of the first and second remote devices 20_1 and 20_2 is automatically set based on the temporary IDs and the characteristic information received from the first and second remote devices 20_1 and 20_2.

Accordingly, the optical relay system 100 may be rapidly normally implemented in the initial installation of the optical relay system 100 or the environmental change of the optical relay system 100 and convenience of a manager may be improved. Further, a service failure may be prevented, which may occur due to a mistake of the manager in manual setting the identification information or an error of a PC for setting the identification information to improve reliability of a mobile communication service. In addition, a time and cost for setting the identification information is reduced to provide the mobile communication service at low cost.

Figure 3:
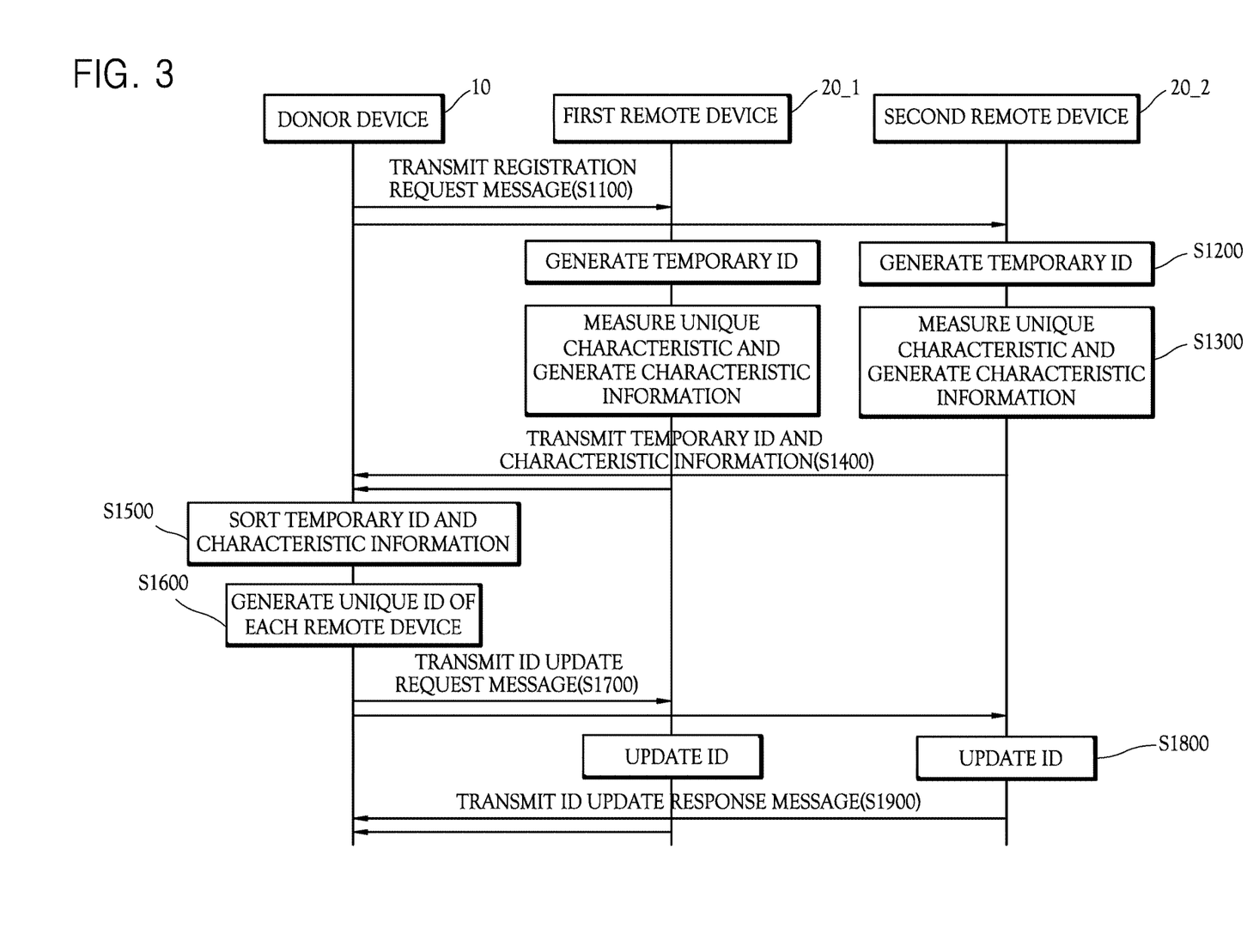
FIG. 3 is a diagram for describing an identification information setting operation of remote devices in the optical relay system of FIG. 1.

FIG. 3 is a diagram for explaining an identification information setting operation of remote devices in the optical relay system 200 of FIG. 2.

Referring to FIGS. 2 and 3, first, the donor device 10 transmits the registration request message to the first remote device 20_1 and transmits the registration request message to the second remote device 20_2 through the first remote device 20_1 (S1100).

Each of the first and second remote devices 20_1 and 20_2 generates the temporary ID and generate the characteristic information by measuring the unique characteristic in response to the registration request message (S1200 and S1300).

Each of the first and second remote devices 20_1 and 20_2 transmits the generated temporary ID and characteristic information to the donor device 10 to request allocation of the unique ID (S1400).

The donor device 10 lists the temporary ID and the characteristic information of each of the first and second remote devices 20_1 and 20_2 and sorts the temporary ID based on the characteristic information and generates the unique ID of each of the first and second remote devices 20_1 and 20_2 (S1500 and S1600).

The donor device 10 transmits the update request message including the unique ID of each of the first and second remote devices 20_1 and 20_2 to the first and second remote devices 20_1 and 20_2 (S1700).

Each of the first and second remote devices 20_1 and 20_2 updates and registers the unique ID corresponding to the update request message as the identification information thereof (S1800).

Subsequently, the first and second remote devices 20_1 and 20_2 transmits an ID update response message indicating ID update completion to the donor device 10 to complete identification information setting (S1900).

Figure 4:
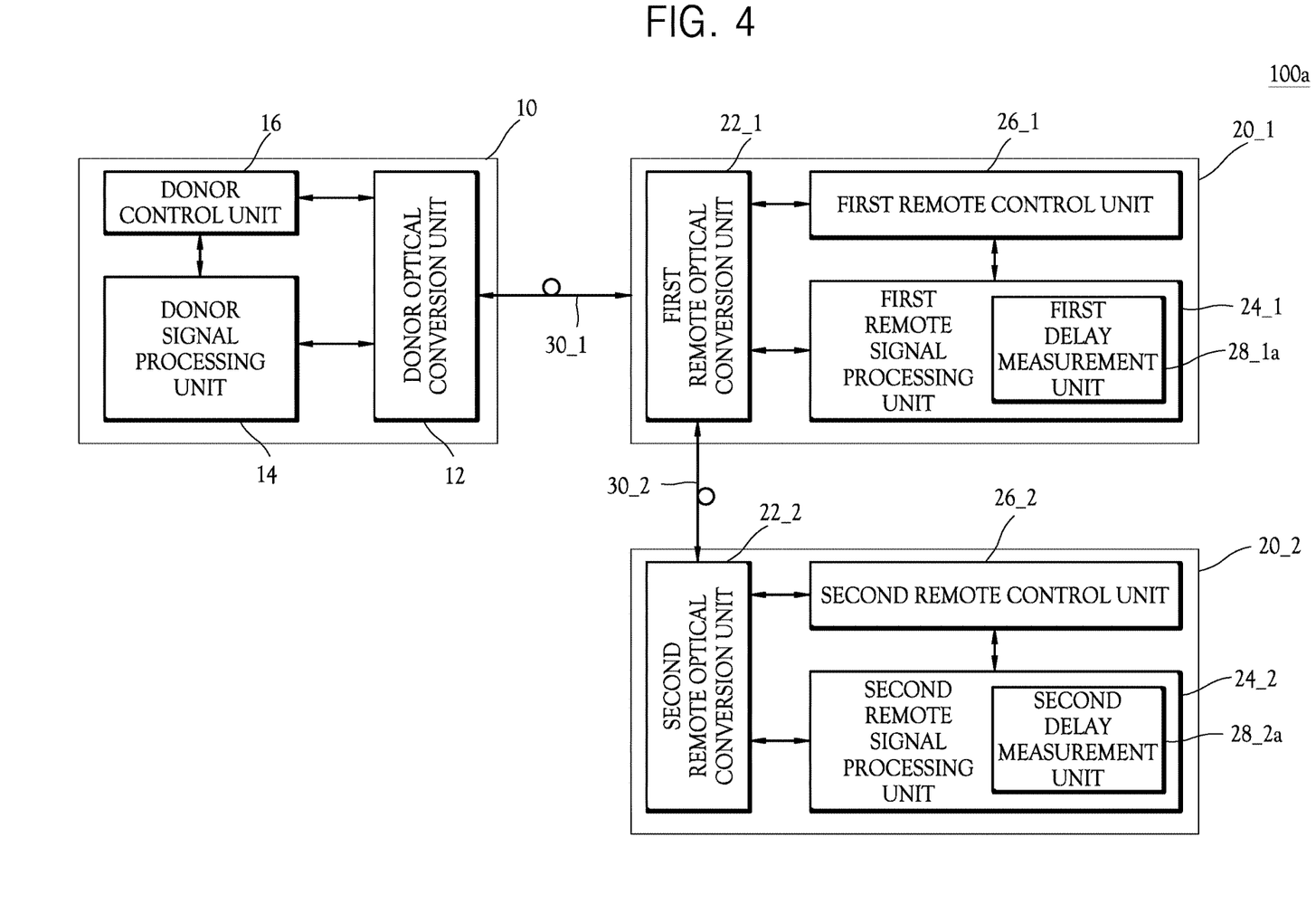
FIG. 4 is a block diagram illustrating an implementation example of an optical relay system according to the inventive concept.

FIG. 4 is a block diagram illustrating an implementation example of an optical relay system according to the inventive concept. In an optical relay system 100a illustrated in FIG. 4, an embodiment is illustrated, in which the unique IDs of the first and second remote devices 20_1 and 20_2 are automatically set based on a delay characteristic of the signal transmitted/received between the donor device 10 and the first remote device 20_1 and the delay characteristic of the signal transmitted/received between the donor device 10 and the second remote device 20_2. In FIG. 4, the same or similar reference numeral as FIG. 2 represents the same or similar member, therefore, detailed description of the same or similar member is described and a difference is primarily described in order to avoid duplication herein.

Referring to FIG. 4, the donor signal processing unit 14 may start loopback in response to a loopback request message received from the donor control unit 16. That is, the donor signal processing unit 14 may generate first and second duplication patterns in response to the loopback request message. The first and second duplication patterns may correspond to first and second measurement patterns received from the first and second remote devices 20_1 and 20_2, respectively and be patterns in which an identifier is inserted into overhead and/or payload of the frame. The donor signal processing unit 14 may transmit the first and second duplication patterns to the first and second remote devices 20_1 and 20_2 corresponding thereto, respectively. The donor signal processing unit 14 may cancel the loopback in response to a loopback cancellation message transmitted from the donor control unit 16.

The donor control unit 16 may transmit the loopback request message to the donor signal processing unit 14 in response to a delay measurement request message transmitted from the first remote device 20_1 and the delay measurement request message transmitted from the second remote device 20_2. The donor control unit 16 transmits the loopback request message to the first remote device 20_1 to allow the first remote device 20_1 to start delay measurement.

The donor signal processing unit 14 may control the donor signal processing unit 14 to transmit the first and second duplication patterns to the first and second remote devices 20_1 and 20_2 corresponding thereto, respectively.

The donor control unit 16 may transmit the loopback cancellation message to the donor signal processing unit 14 in response to a delay measurement cancellation message received from the first and second remote devices 20_1 and 20_2.

Continuously referring to FIG. 4, the first remote device 20_1 may include the first remote optical conversion unit 22_1, the first remote signal processing unit 24_1, the first remote control unit 26_1, and a first delay measurement unit 28_1a. In FIG. 4, it is illustrated that the first delay measurement unit 28_1a is included in the first remote signal processing unit 24_1, but the inventive concept is not limited thereto. The first delay measurement unit 28_1a may be configured separately from the first remote signal processing unit 24_1.

When the first remote control unit 26_1 requests the generation of the measurement pattern in response to the registration request message transmitted from the donor device 10, the first remote signal processing unit 24_1 may generate the first measurement pattern. The first measurement pattern may be the pattern in which the identifier is inserted into the overhead and/or payload of the frame. The first remote signal processing unit 24_1 may generate the first measurement pattern and thereafter, notify that the first measurement pattern is generated to the first remote control unit 26_1. The first remote signal processing unit 24_1 may transmit the first measurement pattern to the donor device 10 together with the delay measurement request message which the first remote control unit 26_1 transmits to the donor device 10 or subsequently to the delay measurement request message.

When the first remote control unit 26_1 is notified that the generation of the first measurement pattern is completed from the first remote signal processing unit 24_1, the first remote control unit 26_1 may transmit to the donor device 10 the delay measurement request message for generating the duplication pattern.

When the first remote control unit 26_1 is notified that the loopback starts from the donor device 10, for example, when the first remote control unit 26_1 receives the loopback request message from the donor device 10, the first remote control unit 26_1 may control the first delay measurement unit 28_1a to start the delay measurement. However, the inventive concept is not limited thereto and although the first remote control unit 26_1 is not notified whether the loopback starts from the donor device 10, the first remote control unit 26_1 allows the first delay measurement unit 28_1a to start the delay measurement.

The first remote control unit 26_1 may receive the delay value from the first delay measurement unit 28_1a and generate the characteristic information of the first remote control unit 26_1. The first remote control unit 26_1 may transmit the delay measurement cancellation message to the donor device 10 when the characteristic information is generated.

When the first delay measurement unit 28_1a receives a delay measurement request from the first remote control unit 26_1, the first delay measurement unit 28_1a may measure the delay value between the donor device 10 and the first remote device 20_1 by using the first measurement pattern and the first duplication pattern received from the donor device 10. In detail, the first delay measurement unit 28_1a compares an identifier counting value of the first measurement pattern and the identifier counting value of the first duplication pattern to measure the delay value between the donor device 10 and the first remote device 20_1.

The first delay measurement unit 28_1a may transmit the delay value to the first remote control unit 26_1, and as a result, the first remote control unit 26_1 may generate the characteristic information based on the delay value.

Since the second remote device 20_2 has substantially the same configuration as the first remote device 20_1, detailed description thereof will be omitted for easy description.

Figure 5:
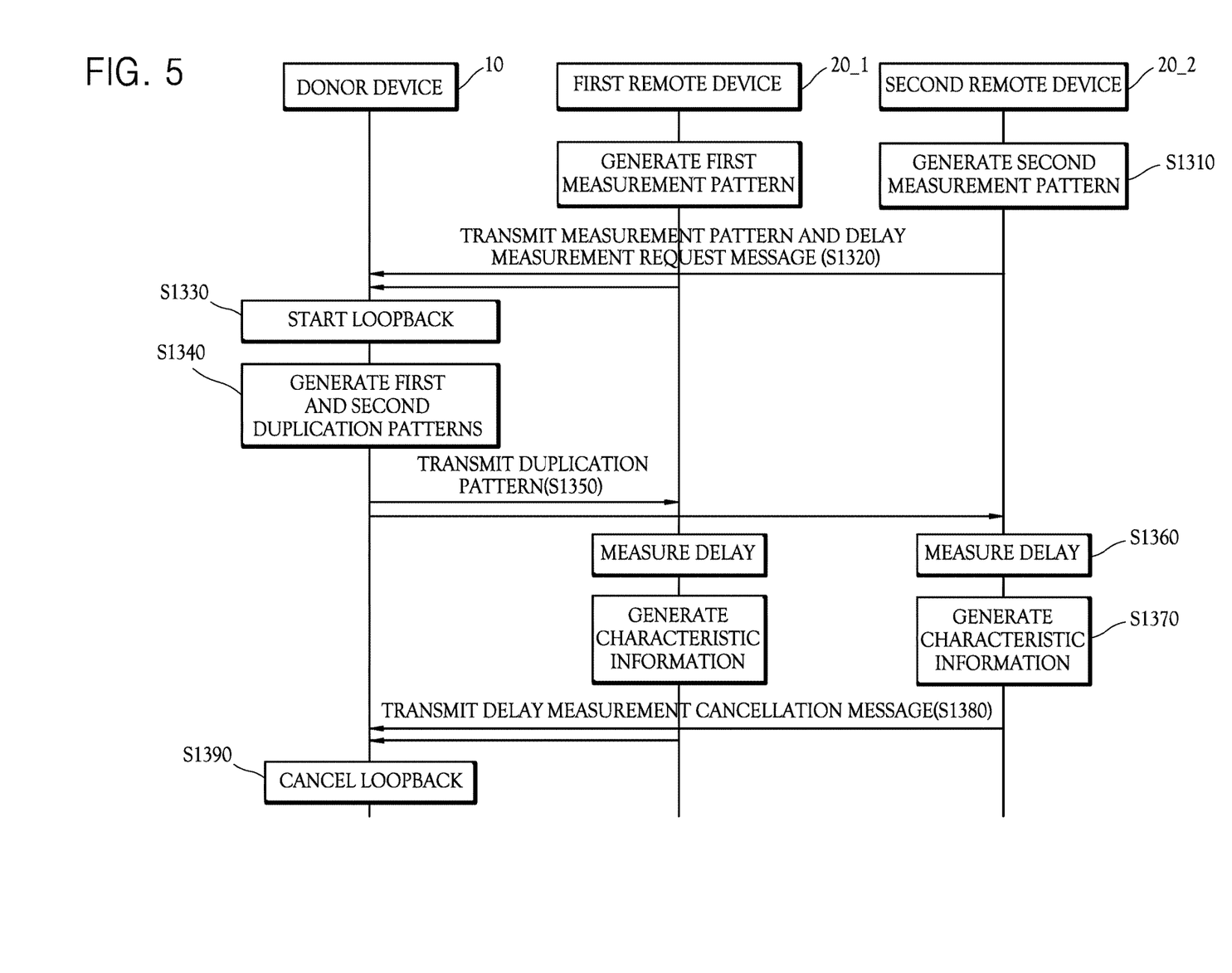
FIG. 5 is a diagram for describing a characteristic information generating operation of the remote device in the optical relay system of FIG. 4.

FIG. 5 is a diagram for describing a characteristic information generating operation of the remote device in the optical relay system 100 of FIG. 4.

Referring FIGS. 4 and 5, first, the first remote device 20_1 forms the first measurement pattern in response to the registration request message received from the donor device 10 and the second remote device 20_2 forms the second measurement pattern in response to the registration request message received from the donor device 10 (S1310).

The first remote device 20_1 transmits the first measurement pattern and the delay measurement request message to the donor device 10 and the second remote device 20_2 transmits the second measurement pattern and the delay measurement request message to the donor device 10 through the first remote device 20_1 (S1320).

The donor device 10 starts the loopback in response to the delay measurement request message and generates the first and second duplication patterns based on the first and second measurement patterns (S1330 and S1340).

The donor device 10 transmits the first and second duplication patterns to the first and second remote devices 20_1 and 20_2 corresponding thereto, respectively (S1350).

The first remote device 20_1 compares the first measurement pattern and the first duplication pattern to measure the delay value between the donor device 10 and the first remote device 20_1 and generate the characteristic information based on the delay value (S1360 and S1370).

The second remote device 20_2 also compares the second measurement pattern and the second duplication pattern to measure the delay value between the donor device 10 and the second remote device 20_2 and generate the characteristic information based on the delay value (S1360 and S1370).

Each of the first and second remote devices 20_1 and 20_2 transmits the delay measurement cancellation message to the donor device 10 to end the loopback (S1380 and S1390).

Figure 6:
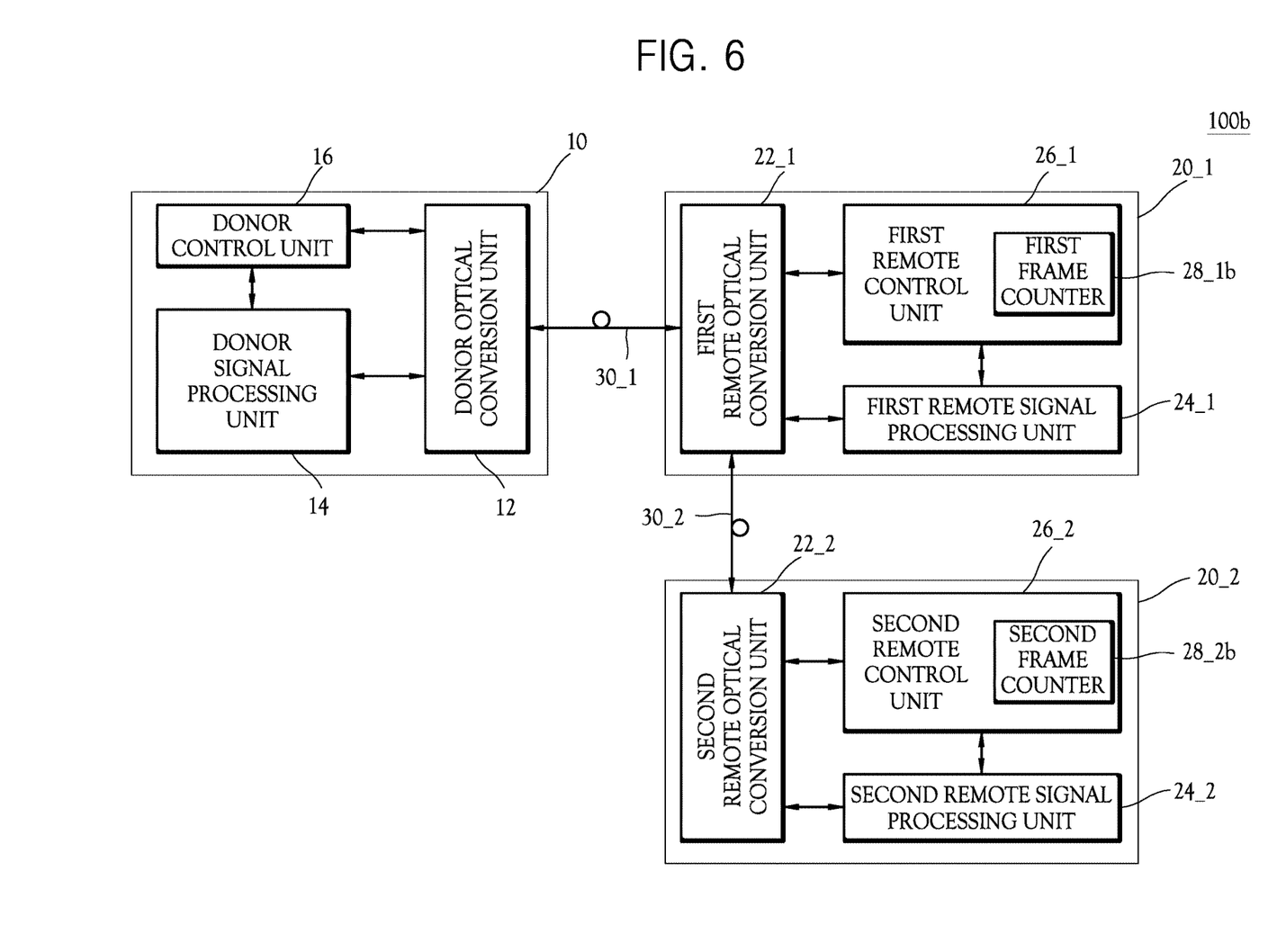
FIG. 6 is a block diagram illustrating another implementation example of an optical relay system according to the inventive concept.

FIG. 6 is a block diagram illustrating another implementation example of an optical relay system according to the inventive concept. In an optical relay system 100b illustrated in FIG. 6, an embodiment is illustrated, in which the unique IDs of the first and second remote devices 20_1 and 20_2 are set based on the frame counting value of the signal transmitted/received between the donor control unit 16 of the donor device 10 and the first remote control unit 26_1 of the first remote device 20_1 and the frame counting value of the signal transmitted/received between the donor control unit of the donor device 10 and the second remote control unit 26_2 of the second remote device 20_2. In FIG. 6, the same or similar reference numeral as FIG. 2 represents the same or similar member, therefore, detailed description of the same or similar member is described and a difference is primarily described in order to avoid duplication herein.

Referring to FIG. 6, the donor control unit 16 may update the counter field in the frame into an initialization or predetermined value in the registration request message and transmit the updated registration request message to the first remote device 20_1.

A first frame counter 28_1b included in the first remote control unit 26_1 may measure a frame counting value by counting the counter filed in the frame in the registration request message. The first remote control unit 26_1 may generate the characteristic information based on the frame counting value measured by the first frame counter 28_1b. The first remote control unit 26_1 adjusts the counter field of the registration request message, for example, increases the counter field value by 1 bit to transmit the counter field to the second remote device 20_2.

The second frame counter 28_2b included in the second remote control unit 26_2 may measure a frame counting value by counting the counter filed in the frame in the registration request message, whose counter field is adjusted by the first remote control unit 26_1. The second remote control unit 26_2 may generate the characteristic information based on the frame counting value measured by the second frame counter 28_2b.

That is, as the counter field is adjusted while the registration request message is transmitted to the second remote device 20_1 through the first remote device 20_1, the first and second remote devices 20_1 and 20_2 may be distinguished from each other by the counter field and the unique IDs of the first and second remote devices 20_1 and 20_2 may be set based on the frame counting value acquired by counting the counter field.

Figure 7:
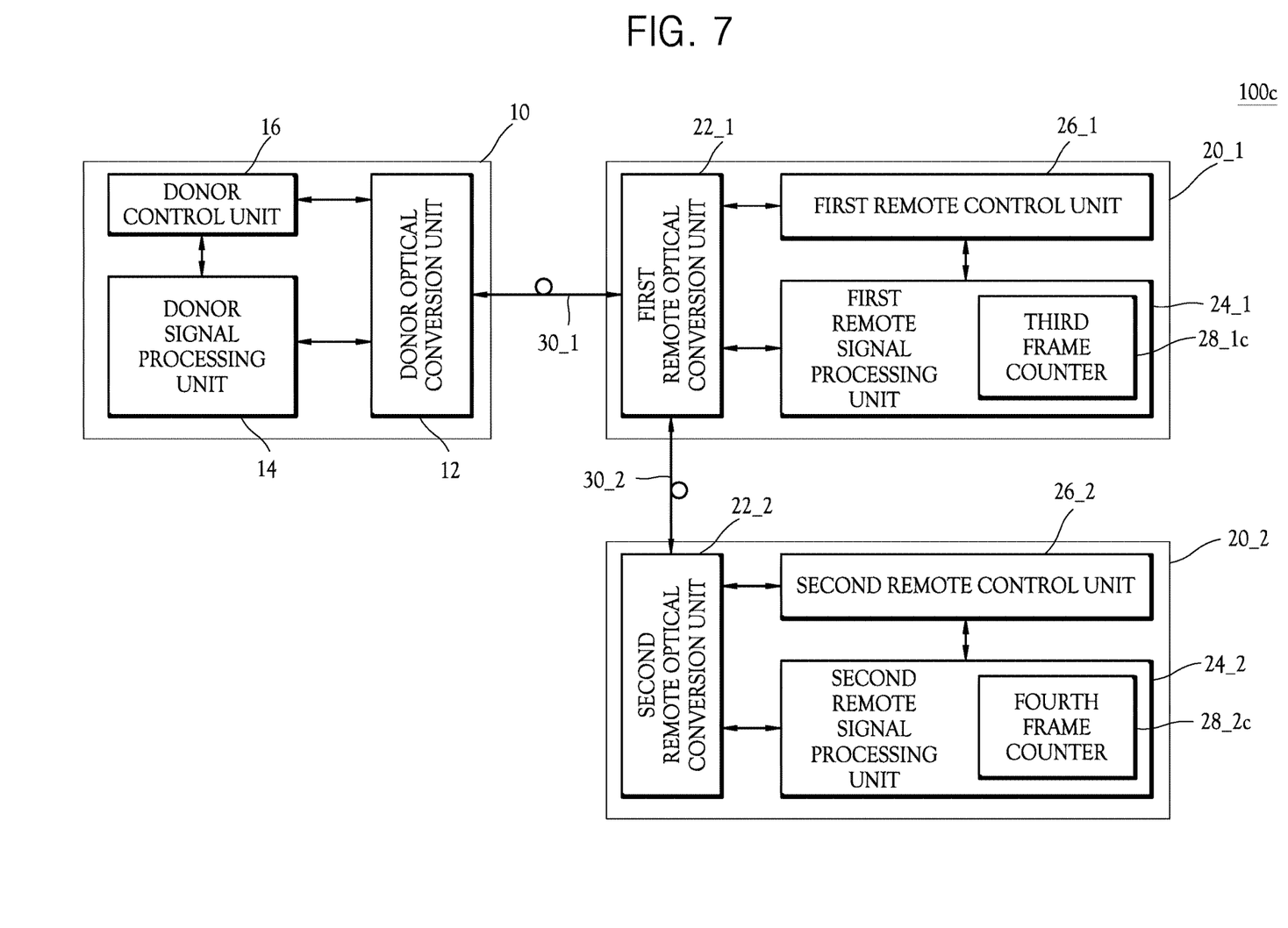
FIG. 7 is a block diagram illustrating yet another implementation example of an optical relay system according to the inventive concept.

FIG. 7 is a block diagram illustrating yet another implementation example of an optical relay system according to the inventive concept. In an optical relay system 100c illustrated in FIG. 7, an embodiment is illustrated, in which the unique IDs of the first and second remote devices 20_1 and 20_2 are set based on the frame counting value of the signal transmitted/received between the donor signal processing unit 24_1 of the donor device 10 and the first remote signal processing unit 24_1 of the first remote device 20_1 and the frame counting value of the signal transmitted/ received between the donor signal processing unit 14 of the donor device 10 and the second remote signal processing unit 24_2 of the second remote device 20_2. In FIG. 7, the same or similar reference numeral as FIG. 2 represents the same or similar member, therefore, detailed description of the same or similar member is described and a difference is primarily described in order to avoid duplication herein.

Referring to FIG. 7, the donor signal processing unit 14 may update the counter field in the frame into an initialization or predetermined value in the downlink digital signal and transmit the updated downlink digital signal to the first remote device 20_1.

A third frame counter 28_1c included in the first remote signal processing unit 24_1 may measure a frame counting value by counting the counter field in the frame in the downlink digital signal transmitted to the first remote signal processing unit 24_1.

The first remote signal processing unit 24_1 may transmit the frame counting value measured by the third frame counter 28_1c and the first remote control unit 26_1 may generate the characteristic information based on the frame counting value.

The first remote signal processing unit 24_1 adjusts the counter field in the downlink digital signal, for example, increases the counter field value by 1 bit and transmit the downlink digital signal, whose counter field is adjusted, to the second remote device 20_2.

A fourth frame counter 28_2d included in the second remote signal processing unit 24_2 may measure a frame counting value by counting the counter field value in the frame in the downlink digital signal which is adjusted by the first remote signal processing unit 24_1.

The second remote signal processing unit 24_2 may transmit the frame counting value measured by the fourth frame counter 28_2d to the second remote control unit 26_2 and the second remote control unit 26_2 may generate the characteristic information based on the frame counting value.

That is, as the counter field is adjusted while the downlink digital signal is transmitted to the second remote device 20_1 through the first remote device 20_1, the first and second remote devices 20_1 and 20_2 may be distinguished from each other by the counter field and the unique IDs of the first and second remote devices 20_1 and 20_2 may be set based on the frame counting value acquired by counting the counter field.

The inventive concept has been described with reference to the embodiments of the inventive concept. However, it will be appreciated by those skilled in the art that various modifications and changes of the inventive concept can be made without departing from the scope of the inventive concept which are defined in the appended claims and their equivalents.

What is claimed is:

1. A method for setting identifiers of at least two remote devices in a distributed antenna system, the method comprising:
   randomly generating, by the at least two remote devices, temporary identifiers of the at least two remote devices such that the temporary identifiers have random values;
   generating, by the at least two remote devices, characteristic information of the at least two remote devices;
   transmitting, by the at least two remote devices, the temporary identifiers and the characteristic information to a donor device communicatively coupled to the at least two remote devices;
   generating, by the donor device, unique identifiers of the at least two remote devices based on the temporary identifiers and the characteristic information; and
   transmitting, by the donor device, the unique identifiers to the at least two remote devices.

2. The method of claim 1, wherein
the randomly generating the temporary identifiers comprises randomly generating, by the at least two remote devices, the temporary identifiers in response to a request message received from the donor device, and
the generating the characteristic information comprises generating, by the at least two remote devices, the characteristic information of the at least two remote devices in response to the request message.

3. The method of claim 1, wherein the generating the unique identifiers of the at least two remote devices comprises
   arranging, by the donor device, a plurality of pairs of the temporary identifiers and the characteristic information with respect to the at least two remote devices based on the characteristic information; and
   generating, by the donor device, the unique identifiers of the at least two remote devices based on a result of the arranging.

4. The method of claim 1, further comprising
   updating, by the at least two remote devices, identification information of the at least two remote devices using the unique identifiers.

5. The method of claim 1, wherein the characteristic information comprises a delay value of a signal transmitted and received between the donor device and the at least two remote devices.

6. The method of claim 1, wherein the characteristic information comprises a frame counting value of a signal transmitted and received between the donor device and the at least two remote devices.

7. The method of claim 1, wherein the characteristic information comprises a position value of a global positioning system (GPS) of a corresponding remote device or a position value of a corresponding remote device based on a base station.

8. A method performed by a donor device of a distributed antenna system to set identifiers of at least two remote devices communicatively coupled to the donor device, the method comprising:
   receiving temporary identifiers and characteristic information of the at least two remote devices from the at least two remote devices, wherein the temporary identifiers are generated randomly by the at least two remote devices such that the temporary identifiers have random values;
   generating unique identifiers of the at least two remote devices based on the temporary identifiers and the characteristic information; and
   transmitting the unique identifiers to the at least two remote devices.

9. The method of claim 8, wherein the generating the unique identifiers of the at least two remote devices comprises
   arranging a plurality of pairs of the temporary identifiers and the characteristic information with respect to the at least two remote devices based on the characteristic information; and
   generating the unique identifiers of the at least two remote devices based on a result of the arranging.

10. The method of claim 8, wherein the characteristic information comprises a delay value of a signal transmitted and received between the donor device and the at least two remote devices.

11. The method of claim 8, wherein the characteristic information comprises a frame counting value of a signal transmitted and received between the donor device and the at least two remote devices.

12. The method of claim 8, wherein the characteristic information comprises a position value of a global positioning system (GPS) of a corresponding remote device or a position value of a corresponding remote device based on a base station.

13. A method performed by a remote device of a distributed antenna system to update identification information, the method comprising:
randomly generating a temporary identifier of the remote device such that the temporary identifier has a random value;
generating characteristic information based on a unique characteristic of the remote device;
transmitting the temporary identifier and the characteristic information to a donor device communicatively coupled to the remote device;
receiving a unique identifier generated based on the temporary identifier and the characteristic information from the donor device; and
updating identification information of the remote device using the unique identifier.

14. The method of claim 13, wherein
the randomly generating the temporary identifier comprises randomly generating the temporary identifier in response to a request message received from the donor device, and
the generating the characteristic information comprises generating the characteristic information in response to the request message.

15. The method of claim 13, wherein the characteristic information comprises a delay value of a signal transmitted and received between the donor device and the remote device.

16. The method of claim 13, wherein the characteristic information comprises a frame counting value of a signal transmitted and received between the donor device and the remote device.

17. The method of claim 13, wherein the characteristic information comprises a position value of a global positioning system (GPS) of the remote device or a position value of the remote device based on a base station.

* * * * *